United States Patent [19]

Cogelia

[11] 4,159,395
[45] Jun. 26, 1979

[54] CABLE GUARD

[75] Inventor: Nicholas J. Cogelia, Duluth, N.J.

[73] Assignee: Bell Telephone Laboratories, Incorporated, Murray Hill, N.J.

[21] Appl. No.: 854,418

[22] Filed: Nov. 23, 1977

[51] Int. Cl.² .............................................. H02G 7/00
[52] U.S. Cl. ................................. 174/136; 150/52 R; 174/5 R; 174/41
[58] Field of Search ................... 174/5 R, 40 R, 41 R, 174/70 A, 97, 135, 136, 138 F; 150/52 R; 191/30, 31, 35; 211/119.18

[56] References Cited

U.S. PATENT DOCUMENTS

| 2,945,081 | 7/1960 | Bogese et al. | 174/135 X |
| 2,991,336 | 7/1961 | Shaw et al. | 191/30 X |
| 3,772,451 | 11/1973 | Canavan et al. | 174/41 |

FOREIGN PATENT DOCUMENTS

| 2359001 | 6/1974 | Fed. Rep. of Germany | 174/97 |
| 181314 | 11/1962 | Sweden | 174/40 R |
| 124847 | 3/1928 | Switzerland | 174/5 R |
| 190515 | 7/1937 | Switzerland | 174/5 R |

Primary Examiner—Laramie E. Askin
Attorney, Agent, or Firm—Sylvia J. Chin

[57] ABSTRACT

A self-locking cable guard for mechanically protecting an aerial cable from damage by squirrels and other animals comprises a longitudinally elongated body having an inverted-V cross section with the legs of the V bent inwardly toward each other to form bent leg sections so as to define a substantially enclosed cavity for receiving and locking onto the aerial cable. The bent leg sections are specifically configured and spaced apart by a predetermined distance to define an expandable resilient spaced gap which facilitates snap-on installation of the guard and at the same time prevents access to the enclosed cable by a squirrel's jaws.

7 Claims, 1 Drawing Figure

U.S. Patent  Jun. 26, 1979  4,159,395
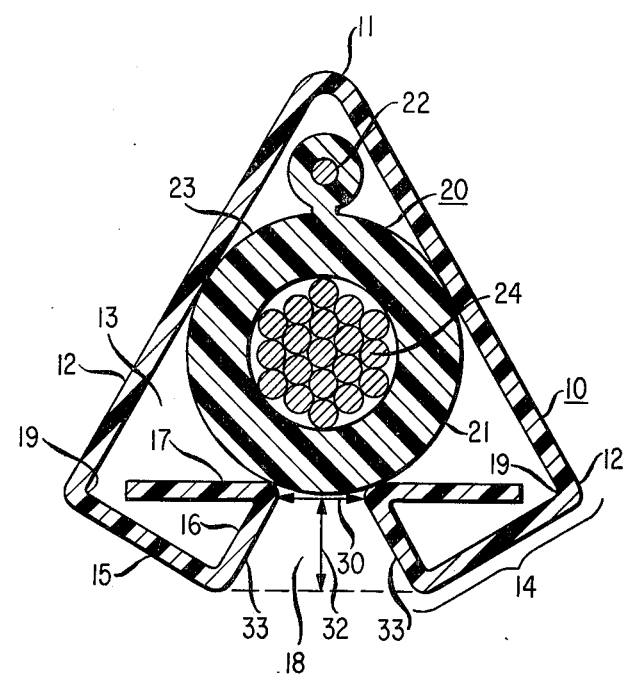

CABLE GUARD

FIELD OF THE INVENTION

This invention relates to cable guards and more particularly to guards which mechanically protect cables from damage by squirrels and other sheath-chewing animals.

BACKGROUND OF THE INVENTION

Cable damage by squirrels and other sheath-chewing animals is a continuing problem. Due to unpredictable migratory patterns, plant areas thought safe from these animals are sometimes suddenly invaded, requiring the use of cable guards.

Various cable guards exist for protecting against these animals. One prior art cable guard, which is relatively simple in construction and adaptable for supported aerial cables, is the chevron guard disclosed in U.S. Pat. No. 3,772,451, issued Nov. 13, 1973. The chevron guard affixes over the topside of a cable to the supporting strand with straps which are inserted through pairs of holes occurring at periodic longitudinal intervals along the guard. The cable is left exposed along the bottom in this cable guard assembly. Unfortunately, squirrels, are able to walk along the bottom of this cable guard assembly, and hence damage the cable, though the awkwardness of walking upside down does operate somewhat as a deterrent. Also, installation of the chevron guard, which is a substantial portion of the cost involved, is somewhat time consuming.

There is especially need for a guard that is easy to install and remove. There is also need for an improved cable guard which is more effective and reliable in mechanically protecting cables against squirrels and other sheath-chewing animals. Desirably, the guard is simple in construction and inexpensive to manufacture.

SUMMARY OF THE INVENTION

In response to the above, an inventive cable guard has been developed which is self-locking and resiliently snaps directly onto a cable for quick and easy installation.

In the illustrative embodiment, the inventive guard is configured to ease installation as well as to substantially shield an aerial cable against animal access to the cable. The inventive aerial cable guard is constructed of rigid vinyl plastic which is extruded to have a transverse V-shaped configuration with the legs of the V bent inwards toward each other to define a substantially enclosed space for receiving the cable to be protected. The bent leg sections are shaped to define a deep and spaced gap so that the legs can easily be spread at the gap for guard installation and yet still deny a squirrel's jaws access to the cable. The legs of the guard snap back to their original position, when spread, via their own inherent resilience to lock the guard onto a cable.

BRIEF DESCRIPTION OF THE DRAWING

The FIGURE shows in transverse cross-section one illustrative embodiment of the inventive cable guard affixed to a conventional self-supporting aerial cable.

DETAILED DESCRIPTION OF THE ILLUSTRATIVE EMBODIMENT

Shown in the FIGURE in transverse cross-section is an illustrative embodiment 10 of the inventive cable guard affixed to a conventional self-supporting aerial cable 20 comprising a supporting strand 22 and a multiconductor telecommunications cable 21 with a sheath 23 surrounding a core of conductors 24.

The aerial cable guard 10 is constructed from rigid vinyl chloride extruded under heat and pressure through forming dies to yield the longitudinally uniform transverse cross-section shown in the Figure. Typically, five feet sections are cut from the continuous extruder output.

Cross-sectionally, the guard 10 comprises an inverted V-shaped configuration having legs 12 that intersect at an apex 11 with their top ends and bend inwardly at a preselected distance from apex 11 to form bent leg sections 14 to define a substantially enclosed cavity 13 for locking onto and enclosing aerial cable 20.

Each bent leg section 14 is further bent into itself forming three portions 15, 16, 17 which are disposed angularly with respect to one another. The bent leg sections 14, and more specifically the leg portions 16, define a spaced gap 18 which tapers as it approaches cavity 13. The gap 18 is narrower than the diameter of the cable 21 at the narrowest width of the gap as depicted by arrow 30 to secure guard 10 to cable 20.

In accordance with one aspect of the invention, the configuration of the guard 10 as defined by the bent leg sections 14 facilitates easy installation. The guard 10 is made of sufficiently resilient material so that the legs 12 will spread apart with respect to apex 11 to affix the guard onto cable 20 and then via their inherent resilience will snap back to their original configuration to lock the guard 10 onto cable 20. Gap 18 operates as an opening to ease and guide entry for the cable 20 into cavity 13 while the taper 33 of the gap 18 aids in the spreading of the legs 13 during installation.

During installation a craftsperson can start at the center of a span. With a five feet guard section, the craftsperson snaps one end of the guard over the cable using the flat heel of the hand, or equivalent, and then snaps and pushes the guard along the cable in the same motion until the guard is mounted. Several guards can hence be easily mounted from one point; the craftsperson butts the successive guard sections to the previously mounted sections to move them along.

While installation is easy, the guard has been found sufficiently secured to a cable so as to withstand 75 mph winds.

If necessary, the guard can be removed by gripping one end and prying it off, a small section at a time.

In accordance with another aspect of this invention, the bent leg sections 14 also advantageously prevent entry of a squirrel's jaws into cavity 13. The gap 18 is sufficiently deep, as depicted by arrow 32, and narrow, as depicted by arrow 30, so that a squirrel's jaws may not bite into a cable which is enclosed in the cavity 13. Furthermore, the folded portions 15, 16, and 17 and their longitudinal continuity rigidify the bent leg sections 14 by operating as flanges in the transverse direction of the guard 10. When a squirrel attempts to get his jaws into the gap 18 towards the cable 20, he tries to deflect the leg portions 16 with respect to the leg portions 15. The leg portions 17 here operate especially as flanges to strengthen the leg portions 16 against flexure, hence denying entry of the squirrel's jaws. Also, the leg portions 17 advantageously limit the amount of deflection possible. The portions 17 can deflect only a predetermined amount before they abut the opposite interior surfaces 19 of the guard.

Advantageously, in the illustrative embodiment, the guard 10 is in contact with the enclosed cable 20 at discontinuous points, reducing moisture buildup otherwise possible to deteriorate the cable. Also, while guard 10 can accommodate a range of cable sizes, it is desirable that the guard fit sufficiently snugly so that the guard does not rotate freely to become a trough for collecting water.

It is apparent that the cable guard is also well suited for mounting onto lashed aerial cables.

While the invention has been described with reference to the illustrative embodiment, it is to be understood that various modifications thereto might be made without departing from the spirit and scope of the following claims.

What is claimed is:

1. A cable guard for protecting an aerial cable comprising:

a longitudinally elongated body having an inverted-V cross section having an apex and two legs, each leg having a first end at the apex and a second end and interior and exterior surfaces, the legs of the V bent inwardly toward each other some predetermined distance from the apex to form bent leg sections so as to define a substantially enclosed cavity for receiving the aerial cable where the bent leg sections are spaced apart to define a gap through which the cable enters the cavity, the legs being sufficiently resilient about the apex to spread apart to install the guard and being capable of snapping back to their original position to lock the guard onto the cable, each bent leg section undergoing an abrupt transition at the gap to form a substantially lateral leg portion containing the second end of the leg with the second end directed away from the gap and toward the interior surface of the same leg, whereby the lateral leg portions reinforce the guard at the gap.

2. The cable guard pursuant to claim 1 wherein the gap is tapered to ease installation.

3. The cable guard pursuant to claim 2 where the gap is sufficiently narrow and deep to prevent animal access to the enclosed cable.

4. The cable guard pursuant to claim 1 wherein each bent leg section is folded to form at least three substantially linear portions for rigidifying the bent leg sections against flexure at the gap.

5. The cable guard pursuant to claim 1 where each bent leg section is folded to form a substantially triangular configuration with first, second, and third portions disposed angularly with respect to one another.

6. The cable guard pursuant to claim 5 where the third portions are the substantially lateral portions being capable of limiting the amount of deflection of the second portions with respect to the first portions to deny animal access to the cable, each of which is integrally attached at one end to the associated third portion and at the other end to the associated first portion.

7. The cable guard pursuant to claim 6 where the second portions of the bent leg sections define the gap.

* * * * *

UNITED STATES PATENT AND TRADEMARK OFFICE
CERTIFICATE OF CORRECTION

PATENT NO. : 4,159,395
DATED : June 26, 1979
INVENTOR(S) : Nicholas J. Cogelia

It is certified that error appears in the above-identified patent and that said Letters Patent are hereby corrected as shown below:

Column 4, Claim 2, line 8, change "wherein" to --where--.
Column 4, Claim 4, line 13, change "wherein" to --where--.

Signed and Sealed this

Eleventh Day of December 1979

[SEAL]

Attest:

SIDNEY A. DIAMOND

Attesting Officer    Commissioner of Patents and Trademarks